Oct. 3, 1939.　　　F. T. SNYDER　　　2,174,900
METHOD FOR MAKING CALCIUM CARBIDE
Filed Nov. 13, 1937
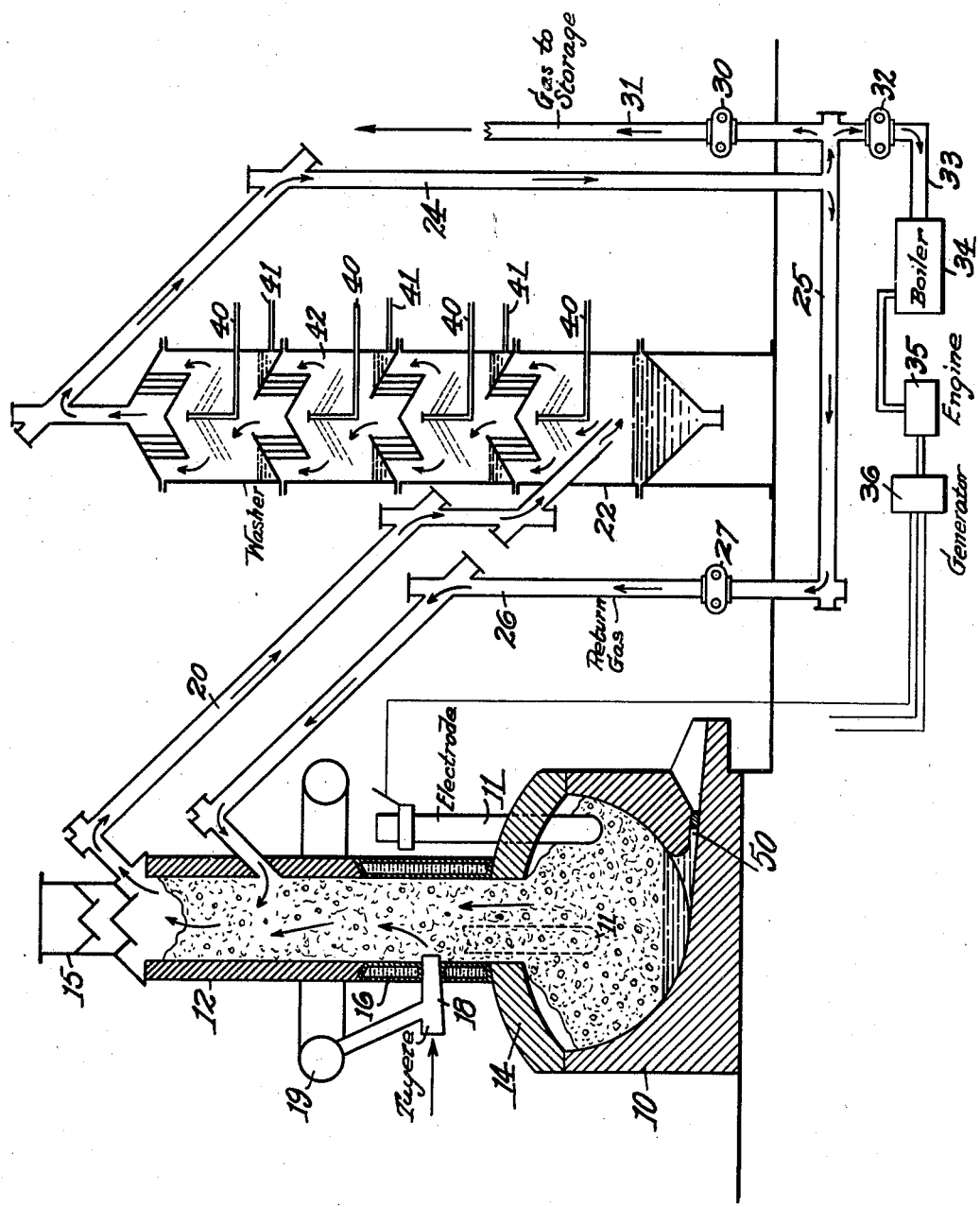
Inventor,
Frederick T. Snyder
By attorney
Chas. R. Hawley.

Patented Oct. 3, 1939

2,174,900

UNITED STATES PATENT OFFICE 2,174,900

METHOD FOR MAKING CALCIUM CARBIDE

Frederick T. Snyder, Brookline, Mass.

Application November 13, 1937, Serial No. 174,446

1 Claim. (Cl. 23—208)

This invention relates to an improved method and to improved apparatus for the economical manufacture of calcium carbide from materials such as limestone or oyster shells, and raw wood in the form of blocks or chips.

It is the general object of my invention to provide a method and apparatus by which calcium carbide may be produced from such materials by a direct and continuous process and with effective conservation of both thermal and electric energy.

A further object of my invention is to produce calcium carbide from raw materials which are distilled in part during the process, and in which process certain residual gases are utilized in the production of electricity, which electricity is used in turn in the final production of carbide from the reduced materials. The oil vapors produced by such distillation are also recovered and form credits against the cost of production.

More specifically, I provide a method and apparatus by which limestone or shells and blocks or chips of raw wood may be first converted to lime and charcoal, and by which said reduced materials are then delivered immediately and without substantial cooling into an electric arc furnace in which the calcium carbide is produced by the usual reduction process.

My invention further relates to ordered steps of procedure and to arrangements and combinations of apparatus which will be hereinafter described and more particularly pointed out in the appended claim.

In the drawing I have shown a preferred form of apparatus by which calcium carbide may be produced by my improved method.

Referring to the drawing, I have shown an electric furnace 10 into which a plurality of electrodes 11 project in the usual manner. Above the furnace there is mounted a kiln 12 which is in the form of an upright shaft, open at its lower end directly through the roof 14 of the furnace 10 to the interior thereof.

A double bell feeder 15 of the usual type is provided above the kiln 12. The lower portion of the kiln is preferably provided with a water-jacket 16 and with one or more tuyères 18 through which air from a bustle pipe 19 may be introduced. A down-pipe 20 leads from the upper end of the kiln 12 to the lower end of a washing apparatus 22.

Washed gases, freed from condensable vapors, are delivered from the top of the washer 22 through a down-pipe 24 to a gas main 25.

The gas main 25 is connected at one end to a return pipe 26 through which a portion of the gas may be returned to the kiln 12 by a blower or exhauster 27.

The gas main 25 is also connected through an exhauster 30 and pipe 31 to a suitable gas storage, and through an exhauster 32 and pipe 33 to a boiler 34 which may furnish steam to operate an engine 35, which in turn may drive an electric generator 36 and thus produce electricity for use in the electric furnace 10.

The washer 22 is preferably of the type in which a series of oil pipes 40 deliver cooled oil in spray form at successive elevations. A series of pipes 41 are provided for drawing off the oil which accumulates in the lower portion of each vertical compartment 42 of the washer.

Having described certain apparatus by which my improved method can be conveniently carried out, I will now describe in detail the procedure by which I produce calcium carbide direct from raw materials by a continuous and self-contained operation.

When the apparatus is in operation, the kiln 12 is substantially full of limestone or oyster-shells or other similar material, mixed with pieces of raw wood in the form of blocks or chips. This material is fed to the kiln through the double bell feeder 15, which operates in the usual way to introduce fresh material without allowing escape of gas.

The pieces of limestone or shells are reduced to lime in the kiln 12, and the pieces of wood are simultaneously distilled and reduced to charcoal, this distillation and reduction being effected by the heat of the gases, largely carbon monoxide, which are produced in part in the electric furnace and in part by combustion of a portion of the charcoal in the lower part of the kiln, said gases passing upward through the kiln. The amount of charcoal thus consumed is controlled by regulating the amount of air introduced through the tuyères 18.

The lime and the rest of the charcoal then pass downward without substantial cooling directly into the furnace 10, where calcium carbide in liquid state is produced by the usual electric arc process. The temperature of the materials thus fed to the furnace may be around 5000° F.

The conservation of heat by passing the lime and charcoal directly to the furnace is thus very substantial. Less heating of the materials in the furnace is needed, and the consumption of electricity is correspondingly reduced.

The distillation of the wood by the hot gases releases the usual oils in the form of vapors, and the distillation and combustion gases and vapors pass off from the kiln 12 through the down-pipe 20 to the washer 22 and then pass up through the washer. During such upward passage, condensable distilled oil vapors are removed from the gases, so that substantially non-condensable gases only pass off through the pipe 24.

A sufficient volume of gases must leave the kiln to carry off the oil vapors. To insure this result, a portion of the washed gas may be returned through the pipe 26 by the blower 27, and be thus recirculated. The larger portion of the gas, however, is commonly delivered through the pipe 33 to the boiler 34, where it produces steam to operate the engine 35 and connected generator 36, by which electricity for the furnace 10 may be produced. If there is a surplus of gas after supplying the boiler 34 and the return pipe 26, such surplus may be drawn off through the pipe 31 to suitable storage.

It will thus appear that my improved process and apparatus is very efficient in conservation of both thermal and electrical energy, and that the entire process may be carried out by the thermal energy released by combustion in the kiln 12.

The vapors recovered in the washer in the form of oils form an additional credit to the general operation and commonly offset a very large part of the cost of fuel. If wood rich in oils is used, such as yellow pine stump wood, the value of the by-product oils so recovered may equal or exceed the entire cost of producing the calcium carbide.

It may be noted also that fuel in the form of soft or bituminous coal may be substituted for wood chips or blocks, in which case coke instead of charcoal will be produced in the kiln and will be fed down into the furnace 10.

The carbide while still in liquid form may be drawn off at the bottom of the furnace through a tap hole 50 in the usual way.

Under certain conditions, it may be desirable to preheat the air supplied to the tuyères 18 to temperatures as high or higher than 2000° F. Combustion gases from the boiler 34 may be used in thus preheating the air supplied to the kiln 12.

While this application relates primarily to the production of calcium carbide, my improved method and apparatus are also capable of use in the production of other electric furnace products.

Having thus described my invention and the advantages thereof, I do not wish to be limited to the details herein disclosed, otherwise than as set forth in the claim, but what I claim is:

In a process for producing calcium carbide which when carried out in an apparatus comprising an upright kiln communicating with an electric furnace directly below the same, comprises charging the kiln with mixed lime-producing material and oil-containing carbonaceous fuel, distilling the oil vapors from the fuel and converting the charge into lime and carbon by passing hot gases upwardly through the fuel, withdrawing the said gases and vapors from the upper portion of the kiln, consuming a portion of the carbon content of the fuel in said kiln to effect distillation of said oil vapors by introducing oxygen-containing gases to the fuel bed at the lower portion of the kiln, discharging the lime and the remaining carbon direct to the electric furnace without substantial heat loss, and heating said charge within said furnace in a reducing atmosphere at a temperature sufficient to convert it into calcium carbide; that improvement which comprises stripping the oil vapors from the gases withdrawn from the kiln and cooling the residual gases, and controlling the temperature and partial pressure on the oil vapors in the distillation zone of said kiln by returning a portion at least of the cooled residual gases to said kiln at a point intermediate the zone at which the oxygen-containing gases are introduced to the kiln and the zone at which the oil-laden gases are withdrawn from the kiln.

FREDERICK T. SNYDER.